United States Patent [19]
Menichetti

[11] Patent Number: 5,685,135
[45] Date of Patent: Nov. 11, 1997

[54] PULL TYPE V-RAKE

[75] Inventor: Silvano Menichetti, Umbertide, Italy

[73] Assignee: Sitrex S.r.l., Trestina, Italy

[21] Appl. No.: 594,615

[22] Filed: Feb. 2, 1996

[51] Int. Cl.[6] ........................................ A01D 78/00
[52] U.S. Cl. .......................... 56/365; 56/377; 56/380
[58] Field of Search ........................ 56/365, 366, 367, 56/370, 377, 384, DIG. 21, 380, 379, 385, 396; 137/899; 214/6 B

[56] References Cited

U.S. PATENT DOCUMENTS

| | | | |
|---|---|---|---|
| 3,817,405 | 6/1974 | Neely, Jr. | 214/6 B |
| 4,248,260 | 2/1981 | Addison et al. | 137/899 |
| 4,723,402 | 2/1988 | Webster et al. | |
| 4,932,197 | 6/1990 | Allen. | |
| 4,947,631 | 8/1990 | Kuehn. | |
| 5,062,260 | 11/1991 | Tonutti. | |
| 5,155,986 | 10/1992 | Kelderman | 56/377 X |
| 5,313,772 | 5/1994 | Tonutti | 56/377 |
| 5,404,702 | 4/1995 | Lewis | 56/365 |
| 5,540,040 | 7/1996 | Peeters | 56/377 |

OTHER PUBLICATIONS

*Crop–Driven Fingerwheel Rakes*, Vicon Farm Machinery, Inc., 6 pages (no date).
*H&S Bi–Fold Wheel Rake*, H&S Manufacturing Co., Inc., 6 pages (no date).
*Concrete Pumps*, Italmacchine, 9 pages (no date).
*Multi Purpose Vee Rakes*, Taege, 2 pages (no date).
*Reead Multi–Rake*, P.&D. Duncan Ltd., 2 pages (no date).
*H&S Bi–Fold Wheel Rake*, H&S Manufacturing Co., Inc., 4 pages Oct. 1989.

Primary Examiner—Terry Lee Melius
Assistant Examiner—Robert Pezzuto
Attorney, Agent, or Firm—Kenyon & Kenyon

[57] ABSTRACT

A V-shaped pull type rake composed of a wheeled transversal element having a tow member extending longitudinally therefrom and a pair of rake arms attached at substantially each end of the cross member. The rake arms are moveable between an open position and a closed position. Each rake arm is provided with a double-acting hydraulic cylinder which is attached at one end to the tow member and at the other end to the rake arm and serves to move the rake arm to which it is attached to a position between (and including) the open and closed positions and all incremental positions therebetween.

12 Claims, 4 Drawing Sheets

PULL TYPE V-RAKE

BACKGROUND OF THE INVENTION

1. Field of the Invention

The invention relates to a collapsible pull type V-shaped rake for gathering hay.

2. Description of Related Art

Collapsible V-shaped pull type hay rakes having two movable arms carrying multiple rake wheels hinged to a wheeled cross bar, rather than a main frame, are known. A common characteristic of these rakes is that the movable hinged arms, which carry the rake wheels, can assume different positions. In particular, the arms can be open, in the characteristic "V" shape used when working, closer together or entirely closed, thus rendering the mechanism less cumbersome for purposes of maneuvering, transportation and storage. The opening and closing motion of the arms is generally accomplished manually, or, automatically, through a hydraulic cylinder acting simultaneously and indirectly on both arms (e.g. for example a closed variable polygon connected to the arms of the rake or an umbrella-like structure wherein the draw bar functions as the guide). None of these methods for opening and closing such V-shaped pull type hay rakes is entirely satisfactory, however. The manual mechanisms are simple and economical, but are slow and inefficient; while the automatic mechanisms are more efficient with respect to opening and closing the arms, but are complex and therefore delicate, costly and difficult to manufacture. Furthermore, none of these rakes allows the separate movement of the arms.

SUMMARY OF THE INVENTION

It is an object of the invention to provide a V-shaped pull type hay rake having two movable arms carrying multiple rake wheels hinged to a wheeled cross bar whose opening and closing mechanism combines the convenience and efficiency of an automatic mechanism with the sturdiness and simplicity of a manual mechanism. These and other objects are achieved, and the above-described problems and inconveniences of the prior art overcome, by the present invention.

The invention is a V-shaped pull type rake having two movable arms carrying multiple rake wheels hinged to a wheeled cross bar which includes mechanisms for opening and closing the hinged rake arms which act directly and separately on each rake arm, such as a hydraulic command directed toward each arm. This feature permits the creation of hay rakes which have both the advantages and efficiencies derived from the automatic rake opening and closing, and the sturdiness, ease of construction, and low cost of production associated with simplicity of manufacture of hay rakes having manual mechanisms. An additional advantage of the invention is that the presence of hydraulic commands for each arm permits, when necessary, the exercise of different motions for each arm. This not only gives the rake a better stability, but also enables the rake to be used in a bifold (i.e. "V") rake mode, by opening both arms, or in a single rake mode, by only opening only one arm.

BRIEF DESCRIPTION OF THE DRAWINGS

The invention will now be described in greater detail with reference to a preferred embodiment, which is illustrated in the accompanying drawings, a brief description of which follows.

DETAILED DESCRIPTION OF THE INVENTION

Figure 1:
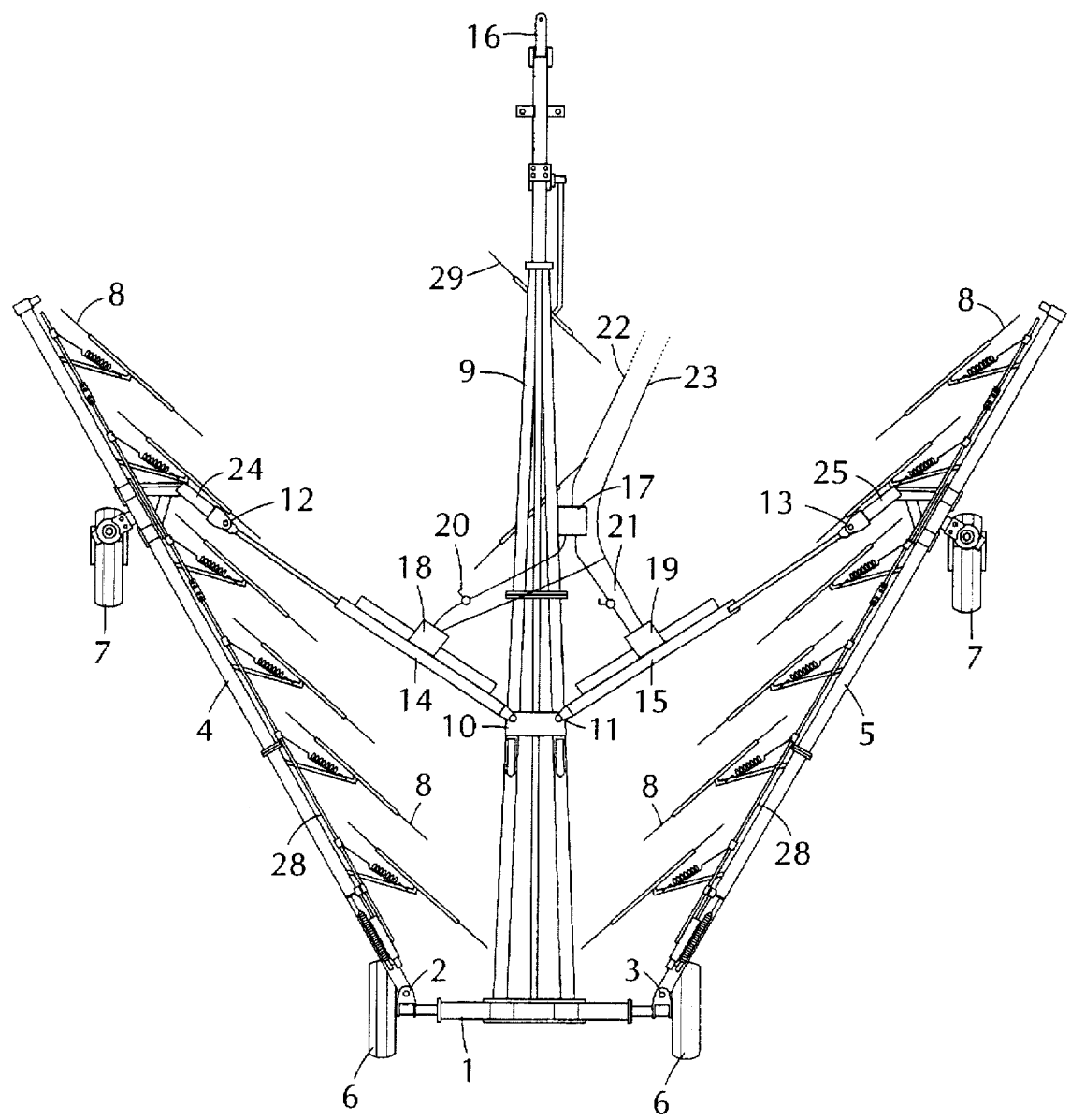
FIG. 1 is an aerial view of an embodiment of the pull rake of the invention, wherein the arms are in the open bifold operating mode.
Figure 2:
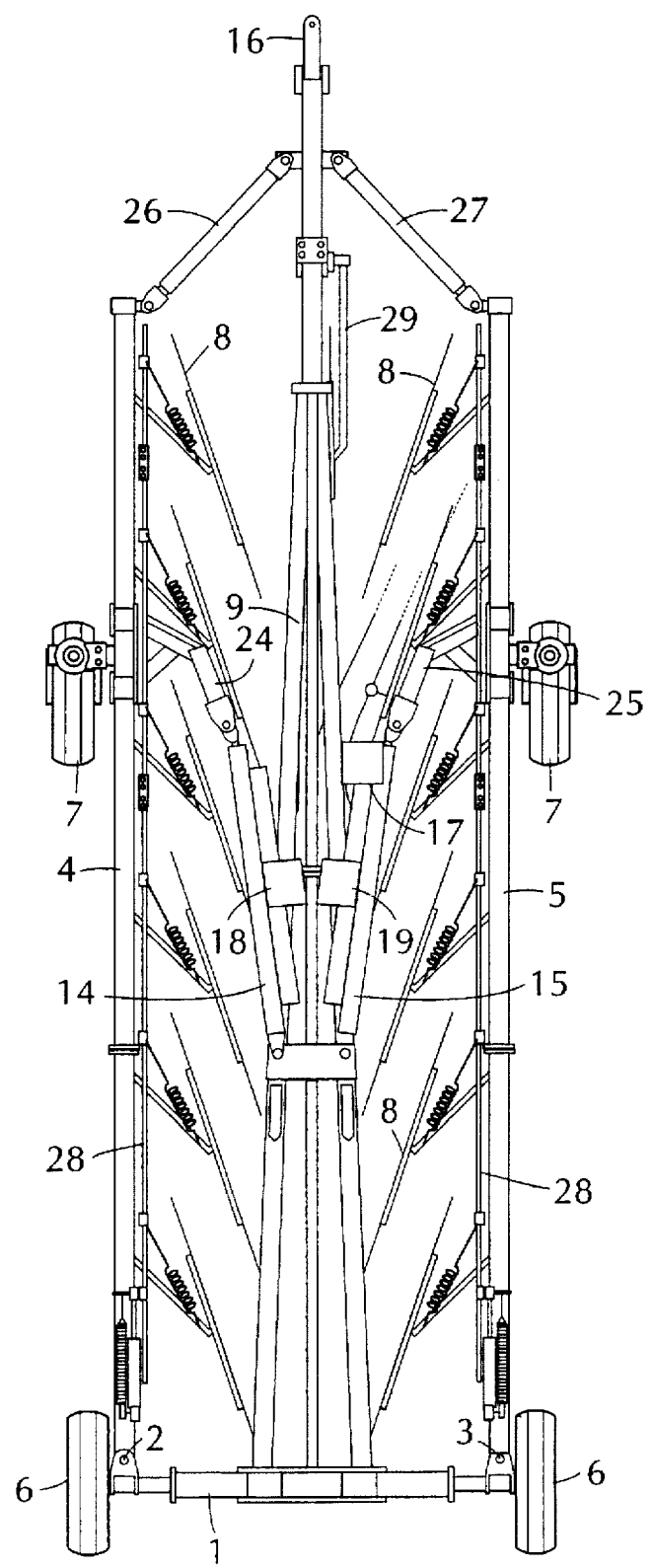
FIG. 2 is an aerial view of the rake of FIG. 1, wherein the arms are in the closed transportation/storage mode.
Figure 3:
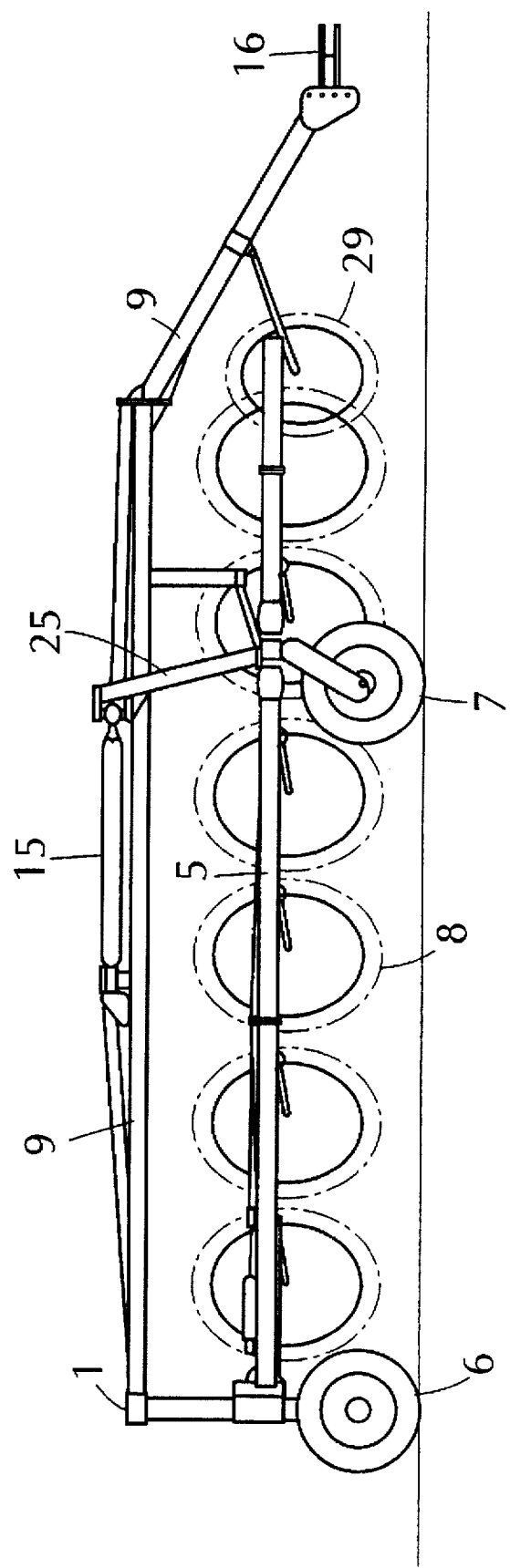
FIG. 3 is a side view of the rake depicted in FIG. 2.

Referring to FIGS. 1–3, a first embodiment of the rake of the invention includes a cross member transversal element or shaft (1). The transversal element or shaft (1) may be equipped with a means for lengthening or shortening, for example, as in this case, by telescoping cylinders, so as to allow the width of the work area of the rake to be varied. The transversal element (1) may be secured or locked in a desired position by any known mechanism for fixing telescoping members. Weight bearing wheels (6) are attached to the transversal element or shaft (1). Arms (4) and (5) carry rotatable rake wheels (8), and are hinged at (2) and (3) to the transversal element (1). Weight bearing self-steering wheels (7) are attached to the arms (4) and (5). Arms (4) and (5) also include appendices (24) and (25). A longitudinal drawing element (9) of a simple or composite structure capable of accomodating two double acting hydraulic cylinders, is rigidly attached to the transversal element (1), and is placed roughly along the center line of the "V" that is formed by the two arms (4) and (5), when in the open position. A tractor for pulling the rake can be attached at the front-most extremity (16) of element (9).

Double acting hydraulic cylinders (14) and (15) are provided to act, respectively, between point (10) of the longitudinal element (9) and point (12) of the appendix (24), and between point (11) of the longitudinal element (9) and point (13) of the appendix (25). Tubes (22) and (23) of the hydraulic system are provided for moving the arms (4) and (5). A two-way hydraulic splitter (17); automatic control shut-off valves (18) and (19); and manual control shut-off valves (20) and (21) are also provided for this purpose.

The rake also includes mechanisms (28) for raising and lowering the rake wheels (8) with respect to the ground. Because such mechanisms are well known in the art and are usually present in this type of machine, they will not be described further except to say that persons skilled in the art know how to employ any of these known mechanisms in the rake of the invention. Supplementary rake wheels may also be (29) attached to the longitudinal element. And, referring to FIG. 2, supplementary safety blocking rods (26) and (27) may also be provided.

Operation of the rake of the invention will now be described. The lengthening and shortening of the double acting hydraulic cylinders (14) and (15) that are placed, respectively, between point (10) of the longitudinal element (9) and point (12) of the appendix (24), and between point (11) of the longitudinal element (9) and point (13) of the appendix (25), cause the opening and closing of the rake arms.

The two-way hydraulic splitter (17) functions to secure uniform movement of the hydraulic cylinders (14) and (15) so as to ensure that the arms (4) and (5) move symmetrically and in synchrony. The automatic control shut-off valves (18) and (19) block the rake arms when there is no hydraulic command, and, as a safety measure, when there is a break/malfunction in the hydraulic system. When necessary, by blocking the hydraulic flow to one of the cylinders the manual control shut-off valves (20) and (21) permit the movement of one arm independently from the other. The supplementary safety blocking rods (26) and (27) may be used to increase the rigidity and safety of the rake when it is in storage or transit.

Figure 4:
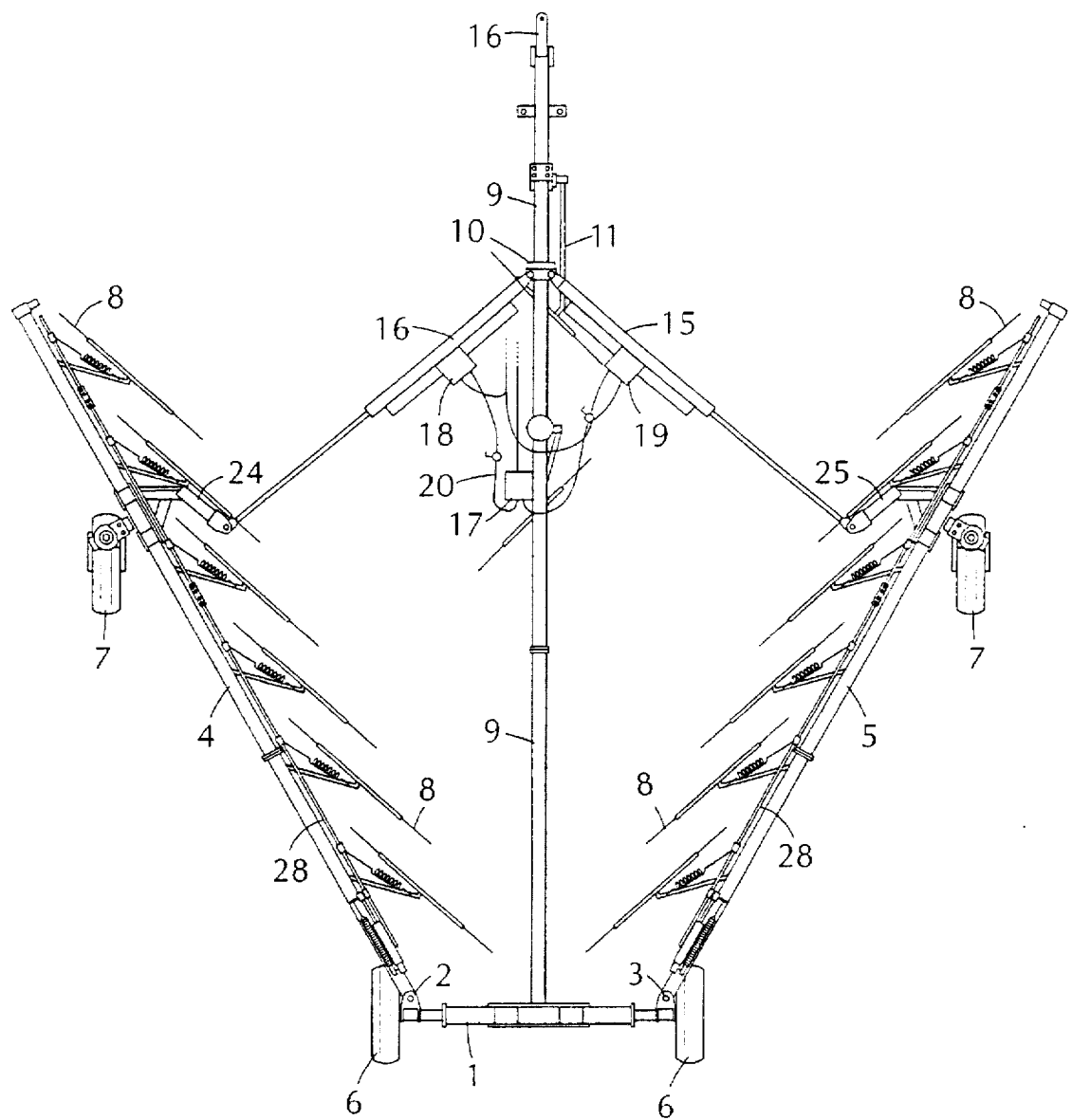
FIG. 4 is an aerial view of another embodiment of the rake of the invention, wherein the arms are in the open bifold operating mode.

Another embodiment of the invention is illustrated in FIG. 4. This embodiment differs from the preferred version in FIGS. 1, 2 and 3 because points (10) and (11) are placed closer to the front extremity (16) of the longitudinal element (9).

The above mentioned features, as illustrated, are exemplary in nature and are not to be construed as limitations of the present invention as set forth in the following claims. Persons skilled in the art will readily appreciate that variations from the description are possible without departing from the spirit and scope of the invention as defined in the claims. For example, variations with respect to the particulars of the geometry, the means of realization, the materials employed, the mechanical and hydraulic components known to persons skilled in the art, or the details of construction. For example, one could modify the point at which the double acting hydraulic cylinders attach, or one could use control valves for each cylinder instead of the two-way hydraulic splitter.

What is claimed is:

1. A "V" shaped pull type rake comprising:

a cross member having a right end and a left end;

a tow member attached to the cross member at a point between the right end and the left end of the cross member and extending longitudinally therefrom;

a first rake arm having a front end and a back and and pivotably mounted at its back end to the cross member at a point between the tow member and the right end of the cross member so as to be moveable between an open position and a closed position;

second rake arm having a front end and a back end and pivotably mounted at its back end to the cross member at a point between the tow member and the left end of the cross member so as to be moveable between an open position and a closed position;

a plurality of rotatable rake wheels mounted on each of the first and second rake arms; and a first and a second double acting hydraulic cylinder, the first hydraulic cylinder having a first section connected to the tow member and a second section connected to the first rake arm, and the second hydraulic cylinder having a first section connected to the tow member and a second section connected to the second rake arm;

wherein each hydraulic cylinder, acting either simultaneously with or independently of the other hydraulic cylinder, serves to move the rake arm to which it is connected between the open position and the closed positioned and all incremental position therebetween.

2. The rake according to claim 1 further comprising a hydraulic splitter for splitting flow of fluid to the hydraulic cylinders.

3. The rake according to claim 1 further comprising a first and a second automatic shut off valve for discontinuing the flow of fluid to the first and second hydraulic cylinders, respectively, each shut off valve being capable of discontinuing movement of the rake arm to which the hydraulic cylinder is coupled in the absence of a hydraulic command.

4. The rake according to claim 3 further comprising a first and second manual shut off valve for discontinuing flow of fluid to the for hydraulic cylinders, respectively, each shut off valve being capable of discontinuing movement of the rake arm to which the hydraulic cylinder is coupled.

5. The rake according to claim 1 further comprising a control valve for each hydraulic cylinder for effecting synchronous and symmetrical movement of the rake arms with respect to each other.

6. The rake according to claim 1 wherein the longitudinally disposed tow member is attached to the cross member approximately midway between the points at which the rake arms are pivotably mounted to the cross member.

7. The rake according to claim 1, wherein the rake wheels of the first rake arm are disposed between the first rake arm and the tow member, and the rake wheels of the second rake arm are disposed between the second rake arm and the tow member.

8. The rake according to claim 1, further comprising:

a first and a second appendix, the first appendix disposed between the second section of the first cylinder and the first rake arm; the second appendix disposed between the second section of the second cylinder and the second rake arm.

9. The rake according to claim 1, wherein the tow member defines a first substantially horizontal plane and the cross member and the first and second rake arms define a second substantially horizontal plane, the first substantially horizontal plane being above the second substantially horizontal plane.

10. The rake according to claim 1, wherein the cross member has a length defined as a distance from the first end to the second end and the tow member has a width substantially narrower than the length of the cross member.

11. The rake according to claim 1, wherein the cross member is wheeled.

12. The rake according to claim 1 wherein the first and the second rake arm each further comprise a support wheel mounted thereon.

* * * * *